United States Patent
Ryu et al.

(10) Patent No.: US 11,228,349 B2
(45) Date of Patent: Jan. 18, 2022

(54) USER EQUIPMENT ASSISTED INTER-SECTOR INTERFERENCE AVOIDANCE

(71) Applicant: QUALCOMM Incorporated, San Diego, CA (US)

(72) Inventors: Jung Ho Ryu, Fort Lee, NJ (US); Arumugam Chendamarai Kannan, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 172 days.

(21) Appl. No.: 16/536,130

(22) Filed: Aug. 8, 2019

(65) Prior Publication Data

US 2020/0052743 A1 Feb. 13, 2020

Related U.S. Application Data

(60) Provisional application No. 62/717,438, filed on Aug. 10, 2018.

(51) Int. Cl.
*H04B 7/0452* (2017.01)
*H04W 16/28* (2009.01)
(Continued)

(52) U.S. Cl.
CPC ......... *H04B 7/0452* (2013.01); *H04L 5/0048* (2013.01); *H04W 16/28* (2013.01)

(58) Field of Classification Search
None
See application file for complete search history.

(56) References Cited

U.S. PATENT DOCUMENTS

2013/0272263 A1* 10/2013 Pi ................... H04L 5/0023
370/330
2016/0337916 A1* 11/2016 Deenoo ............ H04W 36/0088
(Continued)

FOREIGN PATENT DOCUMENTS

EP 3252974 A1 12/2017
EP 3379747 A1 9/2018
(Continued)

OTHER PUBLICATIONS

International Search Report and Written Opinion—PCT/US2019/045857—ISA/EPO—dated Oct. 22, 2019.
(Continued)

*Primary Examiner* — Scott M Sciacca
(74) *Attorney, Agent, or Firm* — Patterson + Sheridan, L.L.P.

(57) ABSTRACT

Certain aspects of the present disclosure provide techniques for reducing inter-sector interference. A method generally includes transmitting, in a multi-user multiple-input and multiple-output (MU-MIMO) mode, first beamformed transmissions using a first beam to a first user equipment (UE) in a first sector and second beamformed transmissions using a second beam to a second UE in a second sector, wherein the BS is configured to control a plurality of sectors comprising the first sector and the second sector, receiving, from the first UE, a feedback report indicating inter-sector interference encountered by the first UE in the first sector due to the second beamformed transmissions, and taking one or more actions based on the feedback report to reduce the inter-sector interference encountered by the first UE in the first sector.

27 Claims, 8 Drawing Sheets

(51) Int. Cl.
 H04B 1/10 (2006.01)
 H04L 5/00 (2006.01)

(56) References Cited

U.S. PATENT DOCUMENTS

2017/0311177 A1* 10/2017 Sarkissian ............. H04W 16/28
2017/0353960 A1* 12/2017 Heninwolf ........... H04B 7/0617
2019/0260539 A1*  8/2019 Muller ................. H04L 5/0051

FOREIGN PATENT DOCUMENTS

WO    2011018031 A1   2/2011
WO    2017086011 A1   5/2017

OTHER PUBLICATIONS

LG Electronics: "Discussion on Interference Measurement and Reporting", 3GPP Draft; R1-1611823, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 13, 2016, XP051175792, 6 pages, Retrieved from the Internet: URL: http://www.3gpp.org/ftp/Meetings_3GPP_SYNC/RAN1/Docs/ [retrieved on Nov. 13, 2016] the whole document.

* cited by examiner

USER EQUIPMENT ASSISTED INTER-SECTOR INTERFERENCE AVOIDANCE

CROSS-REFERENCE TO RELATED APPLICATION

The present Application for Patent claims priority to U.S. Provisional Application No. 62/717,438, filed Aug. 10, 2018, which is assigned to the assignee of the present application and hereby expressly incorporated by reference herein in its entirety.

BACKGROUND

Field of the Disclosure

Aspects of the present disclosure relate to wireless communications, and more particularly, to techniques for reducing inter-sector interference.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications (such as reduced inter-sector interference from beamformed downlink transmissions) between base stations and user equipment in a wireless network.

Certain aspects provide a method for wireless communication by a base station. The method generally includes transmitting, in a multi-user multiple-input and multiple-output (MU-MIMO) mode, first beamformed transmissions using a first beam to a first user equipment (UE) in a first sector and second beamformed transmissions using a second beam to a second UE in a second sector, wherein the BS is configured to control a plurality of sectors comprising the first sector and the second sector, receiving, from the first UE, a feedback report indicating inter-sector interference encountered by the first UE in the first sector due to the second beamformed transmissions, and taking one or more actions based on the feedback report to reduce the inter-sector interference encountered by the first UE in the first sector.

Certain aspects provide a method for wireless communication by a user equipment. The method generally includes receiving, in a first sector, first beamformed transmissions transmitted via a first beam from a base station (BS), receiving, in the first sector, interfering beamformed transmissions transmitted via a second beam from the BS, the interfering beamformed transmissions being associated with the second beam and with a second sector, wherein the BS is configured to control a plurality of sectors comprising the first sector and the second sector, generating a feedback report indicating inter-sector interference encountered by the first UE in the first sector due to the interfering beamformed transmissions, and reporting the feedback report to the BS.

Certain aspects provide an apparatus for wireless communication. The apparatus generally includes a transmitter configured to transmit, in a MU-MIMO mode, first beamformed transmissions using a first beam to a first user equipment (UE) in a first sector and second beamformed transmissions using a second beam to a second UE in a second sector, wherein the apparatus is configured to control a plurality of sectors comprising the first sector and the second sector. The apparatus also includes a receiver configured to receive, from the first UE, a feedback report indicating inter-sector interference encountered by the first UE in the first sector due to the second beamformed transmissions. The apparatus further includes a processing system configured to take one or more actions based on the feedback report to reduce the inter-sector interference encountered by the first UE in the first sector.

Certain aspects provide an apparatus for wireless communication. The apparatus generally includes a receiver configured to receive, in a first sector, first beamformed transmissions transmitted via a first beam from a base station (BS), and receive, in the first sector, interfering beamformed transmissions transmitted via a second beam from the BS, the interfering beamformed transmissions being associated with the second beam and with a second sector, wherein the BS is configured to control a plurality of sectors comprising the first sector and the second sector. The apparatus also includes a processing system configured to generate a feedback report indicating inter-sector interference encountered by the apparatus in the first sector due to the interfering beamformed transmissions. The apparatus further includes a transmitter configured to transmit the feedback report to the BS.

Aspects of the present disclosure also provide various apparatuses, means, and computer program products corresponding to the methods and operations described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
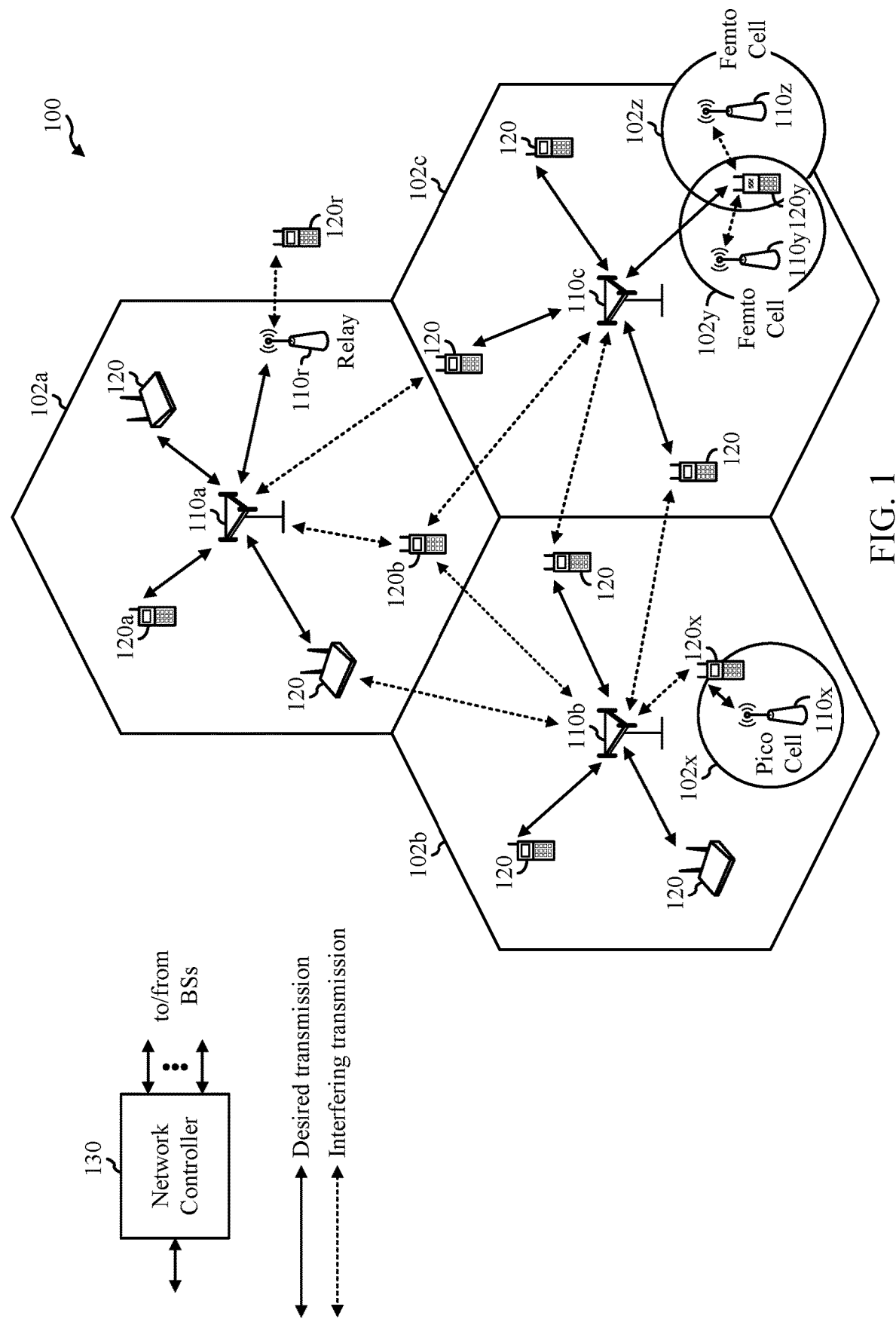
FIG. 1 is a block diagram conceptually illustrating an example telecommunications system, in accordance with certain aspects of the present disclosure.

Aspects of the present disclosure provide apparatus, methods, processing systems, and computer readable mediums for reducing inter-sector interference encountered by a UE based on feedback provided by the UE. For example, a UE in a first sector may monitor interfering beamformed transmissions from a BS to another UE located in a second sector. The UE in the first sector may provide feedback to the BS with regard to the inter-sector interference (such as the interfering beamformed transmissions), and the BS may take one or more actions to reduce the inter-sector interference based on the feedback received from the UE as further described herein.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. The wireless communication network 100 may be a New Radio (NR) or 5G network that provides UE assisted reduction of inter-sector interference. For example, the UE 120*a* may provide feedback to the BS 110*a* with regard to inter-sector interference encountered by the UE 120*a*. In certain aspects, the inter-sector interference encountered by the UE 120*a* may be from beamformed transmissions from the BS 110*a* to the UE 120*b*. The BS 110*a* may take one or more actions as further described herein to reduce the inter-sector interference based on the feedback from the UE 120*a*. For instance, the BS 110*a* may identify the beam that is causing the interference and adjust parameters associated (e.g., a transmit power of the beam) with the beam to reduce the inter-sector interference.

As illustrated in FIG. 1, the wireless network 100 may include a number of base stations (BSs) 110 and other network entities. A BS may be a station that communicates with user equipment (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
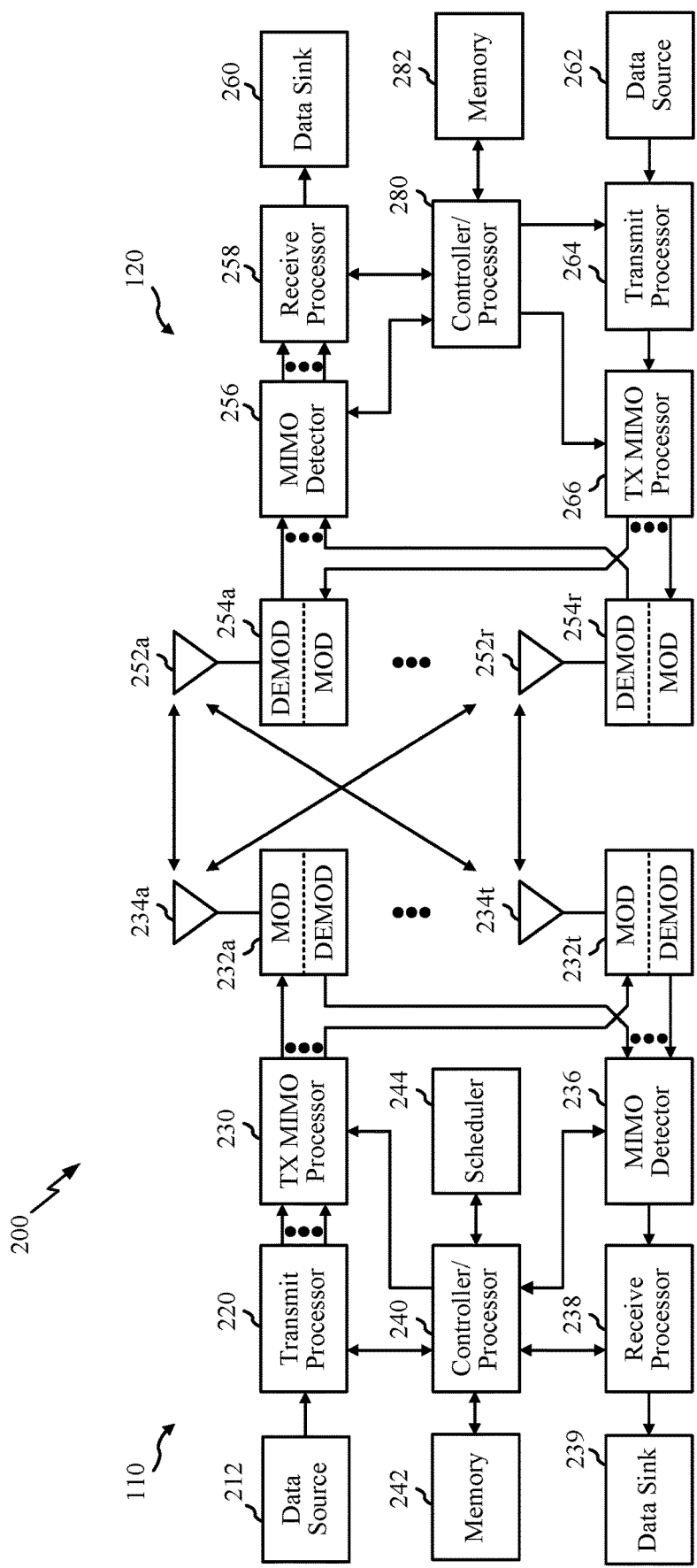
FIG. 2 is a block diagram conceptually illustrating a design of an example base station (BS) and user equipment (UE), in accordance with certain aspects of the present disclosure.

FIG. 2 illustrates example components of BS 110 and UE 120 (as depicted in FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein (such as the operations depicted in FIGS. 3 and 4). For example, the UE 120 may provide feedback to the BS 110 with regard to inter-sector interference encountered by the UE 120. In certain aspects, the inter-sector interference encountered by the UE 120 may be from beamformed transmissions from the BS 110 to another UE located in a different sector than UE 120. The BS 110 may take one or more actions as further described herein to reduce the inter-sector interference based on the feedback from the UE 120. For instance, the BS 110 may identify the beam that is causing the interference and adjust parameters associated (e.g., a transmit power of the beam) with the beam to reduce the inter-sector interference.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a through 254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the base station 110 and the UE 120, respectively. The processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Example User Equipment Assisted Inter-Sector Interference Avoidance

In certain wireless communication systems (e.g., NR/mm-Wave networks), analog beamforming is used to improve the performance of transmissions (e.g., millimeter transmissions). The BS and UE may use directional beams to establish links (e.g., mmWave links). As an example, the BS may use large antenna arrays, which enable the BS to focus a tight/narrow analog beam directed at the UE. Cellular networks can increase network DL capacity if the BS transmits to multiple UEs simultaneously. Communicating with multiple UEs simultaneously is referred to as Multi-User MIMO (MU-MIMO). MU-MIMO enables the BS to serve simultaneous DL transmissions on different directional beams. In NR, with analog beamforming, MU-MIMO uses "orthogonal" resources in spatial domain. With multiple simultaneous DL transmissions in the network, the UEs may encounter increased interference, such as inter-sector interference, intra-sector interference, or inter-cell interference. The present disclosure describes techniques for reducing at least inter-sector interference encountered by a UE using feedback from the UE.

Figure 3:
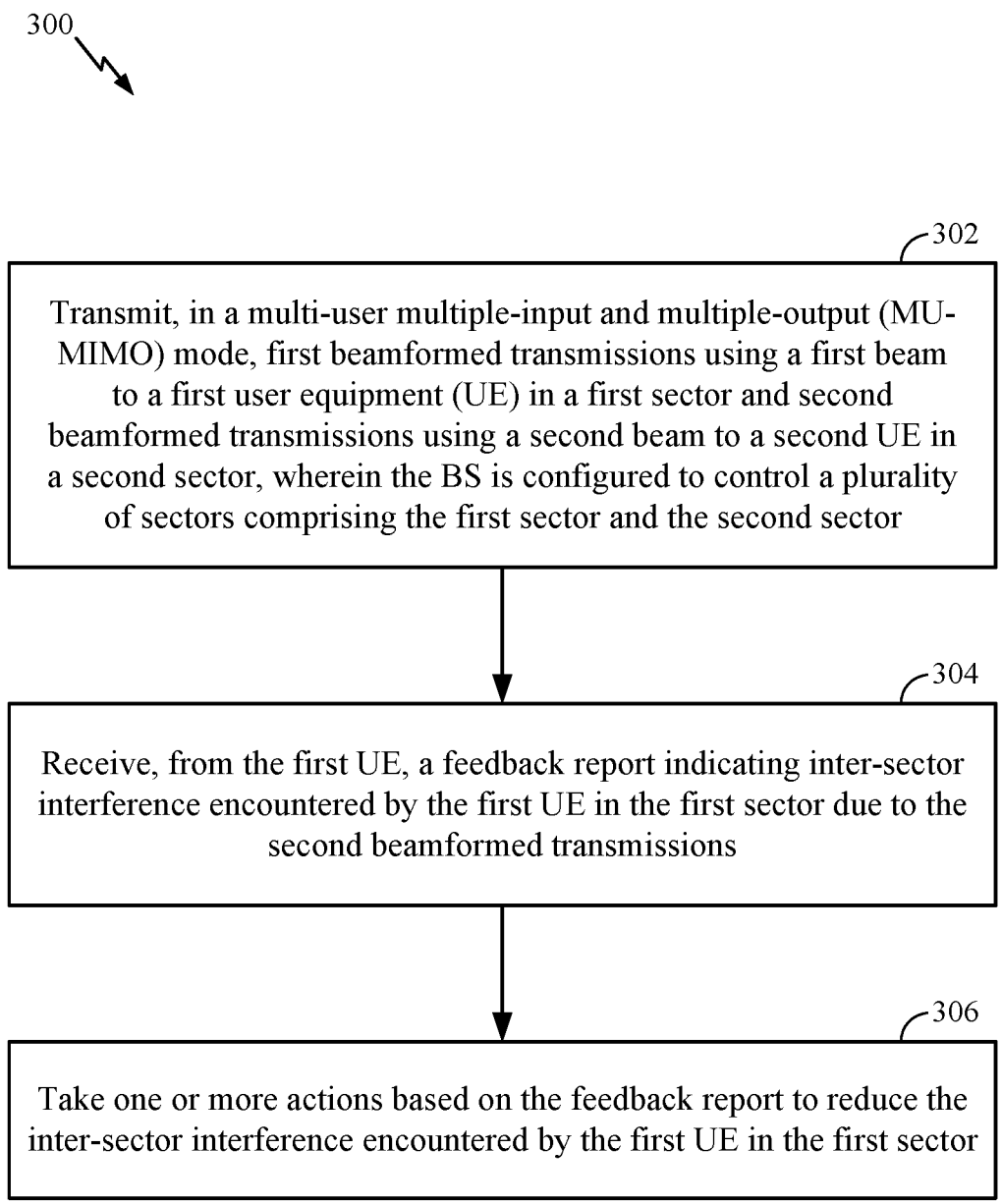
FIG. 3 is a flow diagram illustrating example operations for reducing inter-sector interference, in accordance with certain aspects of the present disclosure.

FIG. 3 is a flow diagram illustrating example operations 300 that may be performed, for example, by a base station (e.g., BS 110), for reducing downlink inter-sector interference, in accordance with certain aspects of the present disclosure.

Operations 300 may begin, at 302, where the BS transmits, in a multi-user multiple-input and multiple-output (MU-MIMO) mode, first beamformed transmissions using a first beam to a first user equipment (UE) in a first sector and second beamformed transmissions using a second beam to a second UE in a second sector, wherein the BS is configured to control a plurality of sectors comprising the first sector and the second sector. At 304, the BS receives, from the first UE, a feedback report indicating inter-sector interference encountered by the first UE in the first sector due to the second beamformed transmissions. At 306, the BS takes one or more actions based on the feedback report to reduce the inter-sector interference encountered by the first UE in the first sector.

Figure 4:
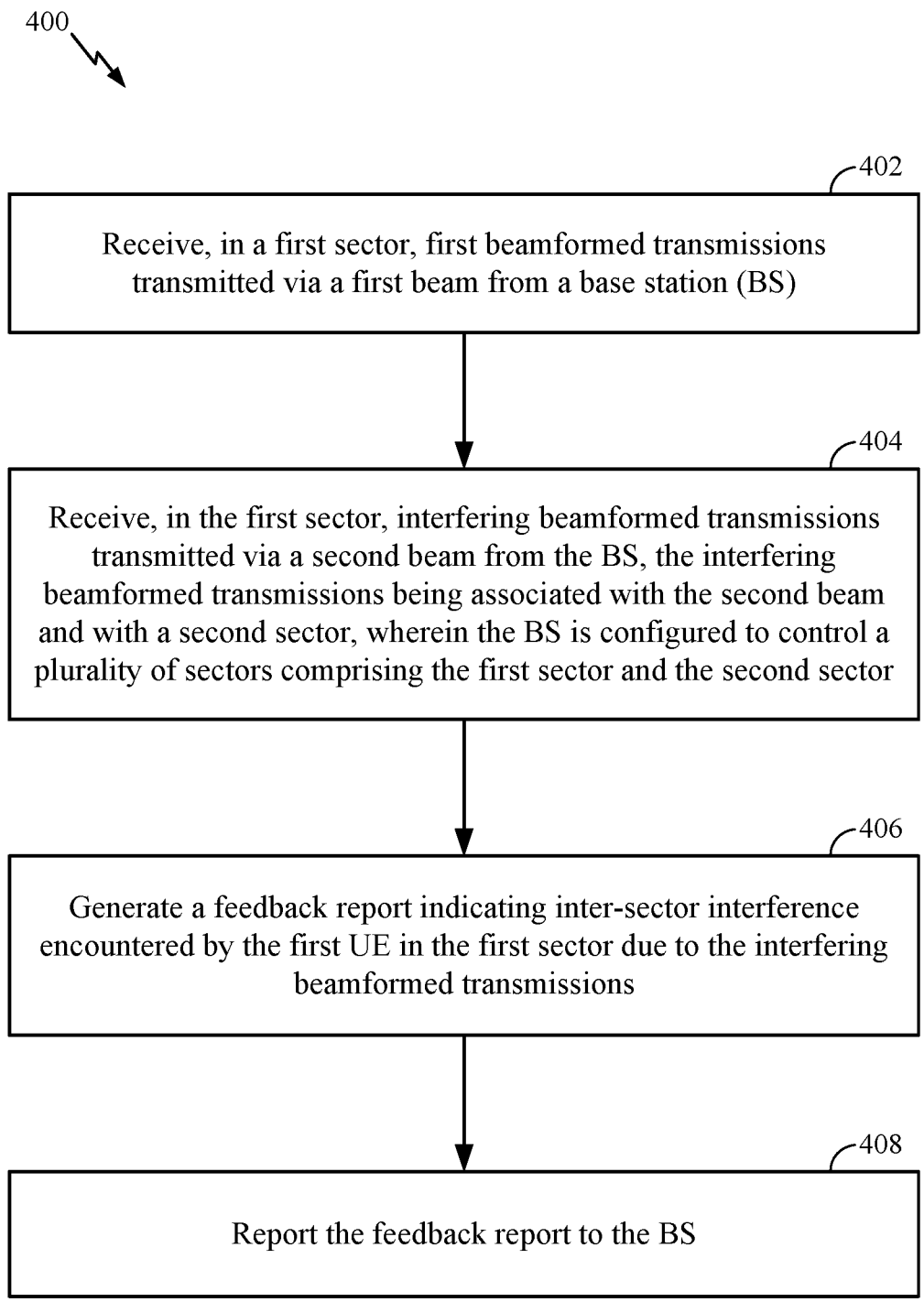
FIG. 4 is a flow diagram illustrating example operations for reducing inter-sector interference, in accordance with certain aspects of the present disclosure.

FIG. 4 is a flow diagram illustrating example operations 400 that may be performed, for example, by a user equipment (e.g., UE 120), for reducing inter-sector interference, in accordance with certain aspects of the present disclosure.

Operations 400 may begin, at 402, where the UE receives, in a first sector, first beamformed transmissions transmitted via a first beam from a base station (BS). At 404, the UE receives, in the first sector, interfering beamformed transmissions transmitted via a second beam from the BS, the interfering beamformed transmissions being associated with the second beam and with a second sector, wherein the BS is configured to control a plurality of sectors comprising the first sector and the second sector. At 406, the UE generates a feedback report indicating inter-sector interference encountered by the first UE in the first sector due to the interfering beamformed transmissions. At 408, the UE reports the feedback report to the BS.

In certain aspects, each of the beamformed transmissions may provide or indicate a beam index associated with the beam and/or a sector index associated with the sector. The beam index may be a unique identifier linked to the beam used for one of the beamformed transmissions, and the sector index may be a unique identifier for the sector from where the beamformed transmission was transmitted. In aspects, the beam index and sector index may be explicitly or implicitly indicated in the beamformed transmissions. For example, control signaling information (e.g., radio resource control (RRC) message, medium access control (MAC) control element (MAC-CE) message, or a downlink control information (DCI) message) may be encoded in the beamformed transmissions with the beam index and sector index. As another example, the beam index and/or sector index may be implicitly indicated based on phase or frequency variations of the signal used to transmit the beamformed transmission.

In certain aspects, the BS may indicate, to the UE (e.g., the first UE of operations 300), the beamformed transmissions (e.g., the second beamformed transmissions of operations 300) that are simultaneously transmitted with transmissions to the UE. The indication of the beamformed transmissions may be provided by a scheduling control message via a DCI message, MAC-CE message, or RRC message, for example. For instance, the BS may transmit, to the UE, a scheduling control message that indicates a beam index associated with each of the beamformed transmissions and a sector index associated with each of the beamformed transmissions. As another example, at 302, the BS may transmit, to the first UE, the first beamformed transmissions with a scheduling control message that indicates a first beam index associated with the first beam, a first sector index associated with the first sector and the first beam, a second beam index associated with the second beam, and a second sector index associated with the second sector and the second beam.

The beamformed transmissions may include various types of transmissions. As examples, the beamformed transmissions may include a beam training transmission, a beam management transmission, a control transmission, a scheduling transmission, or a data transmission. That is, the beamformed transmissions may be from a beam training operation, beam management operation, or a data link. The beamformed transmissions may also include various types of synchronization signals or reference signals, such as a channel state information reference signal (CSI-RS) or a demodulation reference signal (DM-RS). In aspects, the sector antennas may be arranged in different azimuthal orientations (e.g., 120° spacings). For example, the first beamformed transmissions at 402 may be transmitted via a first sector antenna that is arranged in a different azimuthal orientation than a second sector antenna used for transmitting the interfering beamformed transmissions.

The feedback report may provide information related to the downlink inter-sector interference encountered by the UE. The UE may determine the beams to include in the feedback report, at 406, based on the scheduling control message received at 402 and/or the interfering beamformed transmissions received at 404. For instance, the feedback report may provide one or more received signal powers of interfering beamformed transmissions, a beam index associated with each of the received signal powers, and/or a sector index associated with each of received signal powers. The received signal power may be an indication of the signal power of interfering beamformed transmission measured by the UE such as a received signal strength indication (RSSI) or a reference signal received power (RSRP). The beam index and/or sector index may be identified by the UE from indexes included in the beamformed transmissions as described herein. In aspects, the one or more received signal powers may be measures of signal power (e.g., RSSI or RSRP) of the interfering beamformed transmissions, based on the beam index and/or sector index, received by the UE. In certain aspects, the UE may also generate unique identifiers for the beam index and/or sector index. The feedback report may be transmitted via various types of messages, including an acknowledgment (ACK) message, a negative ACK (NACK) message, a channel state information (CSI) report, a random access channel (RACH) message, an interference measurement report, or a beam management report.

Upon receiving a feedback report, the BS may perform various actions to reduce the downlink inter-sector interference encountered by the UE. The BS may identify the beam that is causing the interference and adjust parameters associated with the beam to reduce the inter-sector interference. For instance, the BS may adjust the transmit power of a beam identified in the feedback report, select a different UE for transmission, switch to single user-MIMO (SU-MIMO) mode, or switch to another beam than the interfering beam. In SU-MIMO mode, the BS may communicate with only a single UE at a time on a particular frequency resource (e.g., a frequency band or subband), whereas in MU-MIMO mode, the BS may communicate with multiple UEs simultaneously on the same frequency resource. The BS may perform the one or more actions if the received signal power of an interfering transmission is greater than or equal to a threshold value. As an example, the BS may reduce the transmit power for an interfering beamformed transmission with a reported signal power greater than the threshold. This may reduce the signal strength of the interfering transmission encountered by the UE. As another example, the BS may switch to SU-MIMO to communicate with the UE encountering inter-sector interference. The BS may take any combination of actions as described herein to reduce the inter-sector interference encountered by the UE.

In aspects, the BS may select a different UE to send transmissions than the UE associated with the interfering transmission. The BS may schedule the interfering transmission for a different time slot than that used for the UE encountering the inter-sector interference and also replace transmissions to the interfering UE with transmissions to a UE that might not interfere. This may eliminate the inter-sector interference associated with the interfering transmission and also allow the BS to remain in MU-MIMO mode. For example, the BS may select a third UE in the second sector of operations 300. The BS may transmit, in the MU-MIMO mode, the first beamformed transmissions using the first beam to the first UE in the first sector and third beamformed transmissions using a third beam to the third UE in the second sector at a first time period. Then, the BS may transmit, in the MU-MIMO mode, the second beamformed transmissions using the second beam to the second UE in the second sector at a second time period that is different than the first time period.

In aspects, the BS may identify that there are other beams available for communicating with the interfering UE than the beam that is causing the inter-sector interference. The BS may transmit the beamformed transmission using a different beam than the beam causing inter-sector interference. For instance, the BS may switch to a secondary beam of lower quality to serve a UE instead of primary beam of higher quality. As used herein, a primary beam may be a beam having higher signal quality than another beam, and a secondary beam may be a beam having lower signal quality than another beam. The BS may select the secondary beam if the beam has a quality greater than or equal to a threshold quality value. As another example, the BS may transmit to the second UE of operations 300 using a different beam than the second beam for the second beamformed transmissions.

Figure 5A:
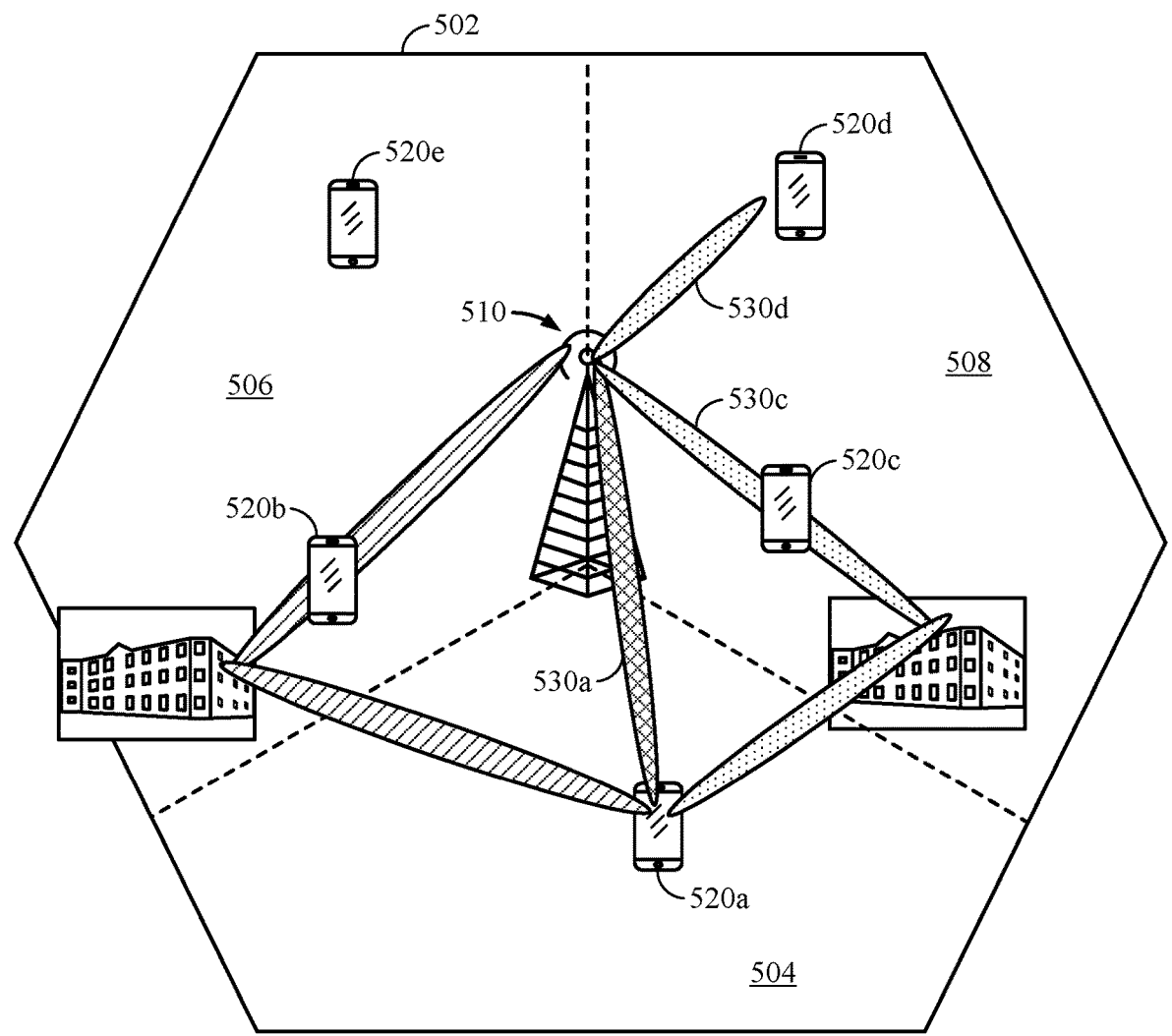
FIG. 5A illustrates an example coverage cell where a UE is encountering inter-sector interference, in accordance with certain aspects of the present disclosure.

FIG. 5A illustrates an example coverage cell for a base station where a UE is encountering inter-sector interference, in accordance with certain aspects of the present disclosure. As shown, the BS 510 has a coverage cell 502 partitioned into three sectors having a first sector 504, a second sector 506, and a third sector 508. The sectors 504, 506, 508 may be linked to antennas arranged in different azimuthal orientations (e.g., 120° spacing).

In this example, the cell 502 provides links to UEs including a first UE 520a, a second UE 520b, a third UE 520c, a fourth UE 520d, and a fifth UE 520e. The first UE 520a may receive, in the first sector 504, beamformed downlink transmissions on a first beam 530a and interfering beamformed downlink transmissions on a second beam 530b and a third beam 530c used to communicate with second and third UEs 520b, 520c, respectively. As illustrated, the second and third beams 530b, 530c may be directed to the second and third UEs 520b, 520c in the second and third sectors 506, 508, respectively, but the interfering beamformed transmissions on these beams may reflect into the first sector 504 causing inter-sector interference with the first UE 520a. The first UE 520a may generate a feedback report indicating inter-sector interference encountered by the first UE 520a in the first sector 504 due to the interfering beamformed transmissions. The BS 510 may take one more actions based on the feedback report to reduce the inter-sector interference encountered by the first UE 520a in the first sector 504.

Figure 5B:
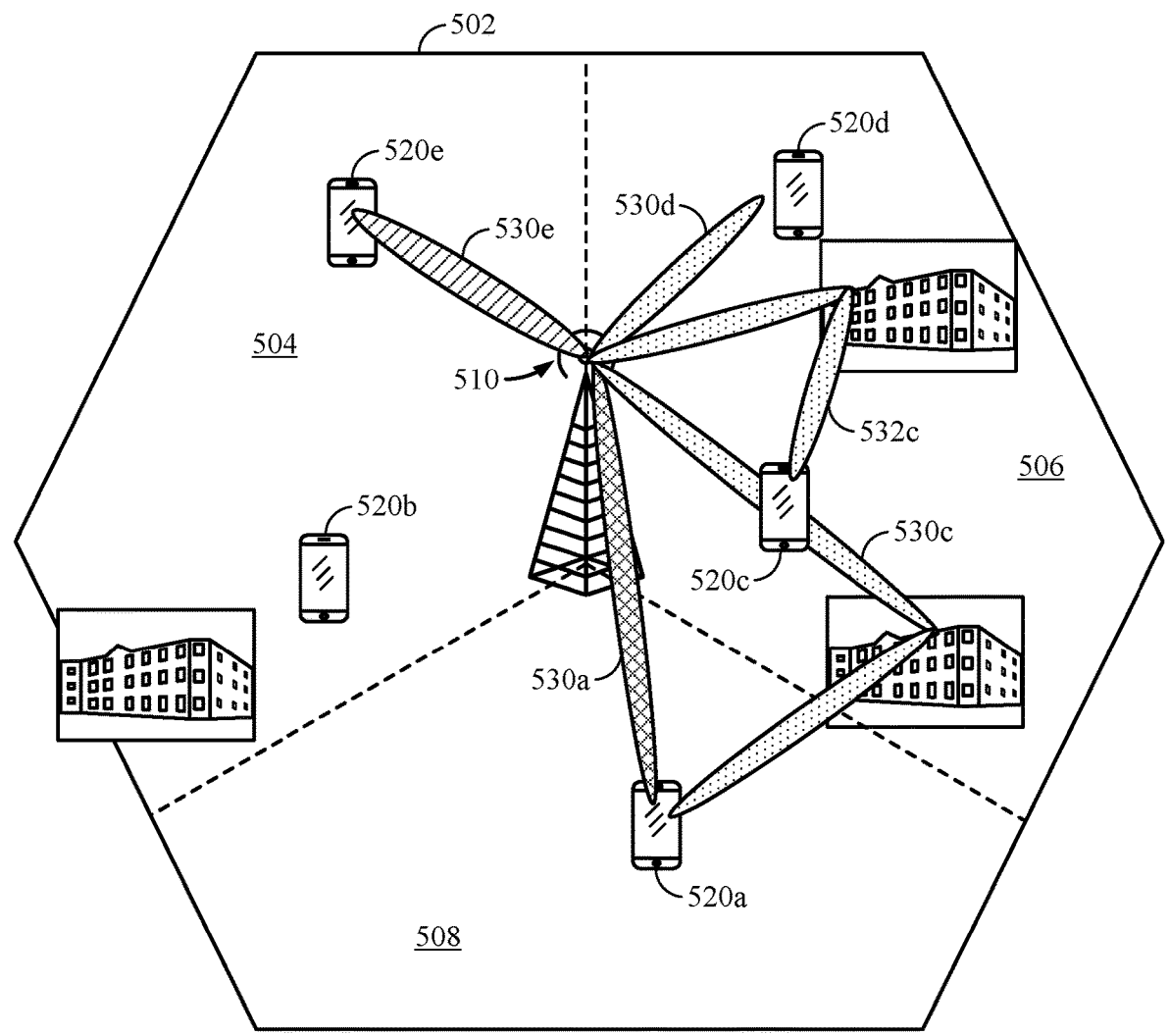
FIG. 5B illustrates an example coverage cell where various actions are taken to reduce inter-sector interference, in accordance with certain aspects of the present disclosure.

FIG. 5B illustrates an example coverage cell for a base station where various actions are taken to reduce the inter-sector interference encountered by a UE, in accordance with certain aspects of the present disclosure. The BS 510 may reduce the transmit power of the beamformed transmissions on the third beam 530c. As another example, the BS 510 may select to transmit to the fourth and/or fifth UEs 520d, 520e on beams 530d, 530e, which are directed away from the first UE 520a, during the same time period used to transmit to the first UE 520a. As the beams 530d and 530e are directed away from the first UE 520a, the first UE 520a may not encounter inter-sector interference from such beams. The BS 510 may also select a different beam to transmit to the second UE 520c, such as the secondary beam 532c. In this example, the secondary beam 532c may have a lower quality than the primary beam 530c.

Figure 6:
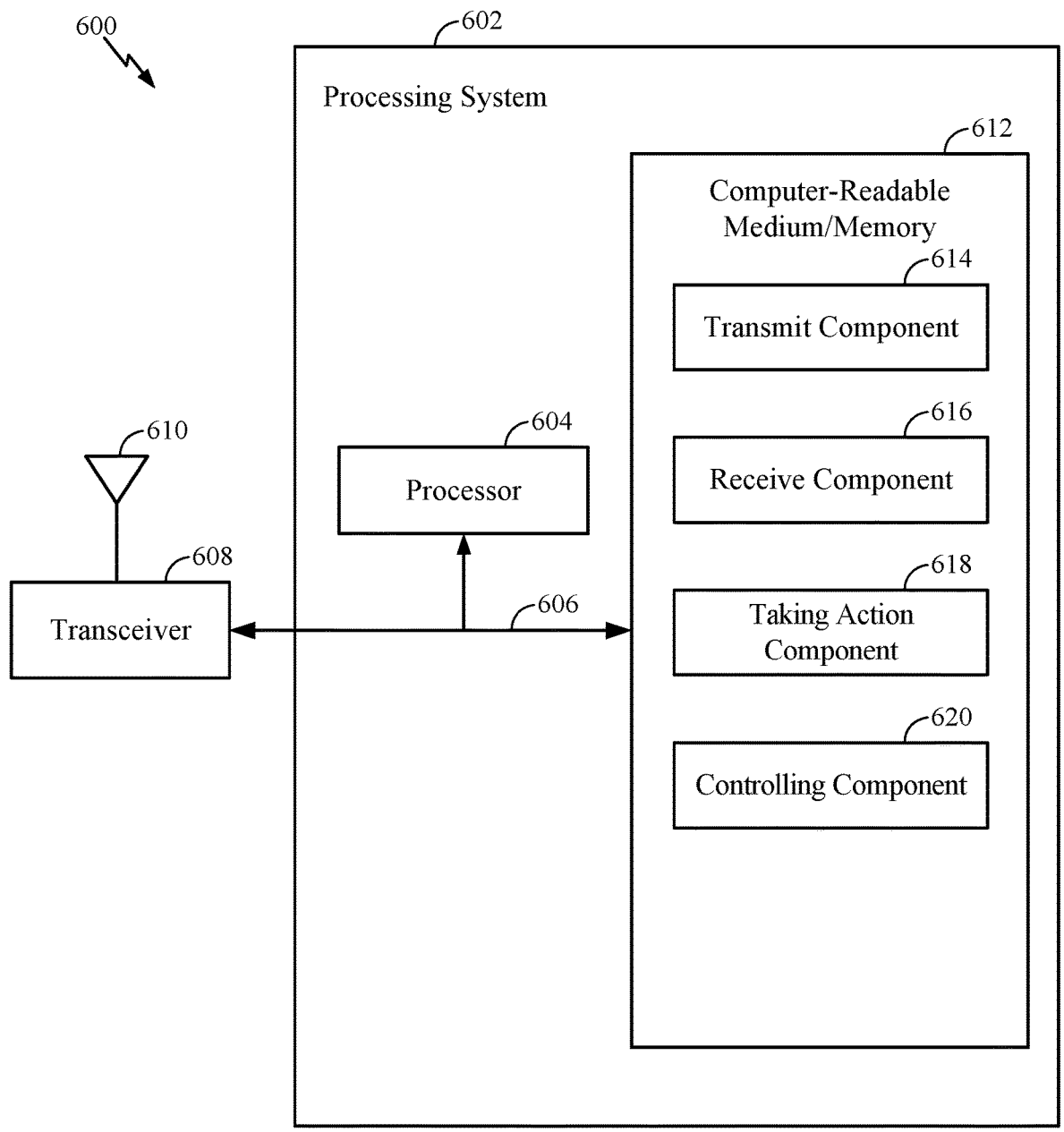
FIG. 6 illustrates a communications device that may include various components configured to perform operations for the techniques disclosed herein in accordance with aspects of the present disclosure.

FIG. 6 illustrates a communications device 600 (e.g., BS 110) that may include various components (e.g., corresponding to means-plus-function components) configured to perform operations for the techniques disclosed herein, such as the operations illustrated in FIG. 3. The communications device 600 includes a processing system 602 coupled to a transceiver 608. The transceiver 608 (e.g., a transmitter and/or receiver) is configured to transmit and/or receive signals for the communications device 600 via an antenna 610, such as the various signal described herein. The processing system 602 may be configured to perform processing functions for the communications device 600, including processing signals received and/or to be transmitted by the communications device 600.

The processing system 602 includes a processor 604 coupled to a computer-readable medium/memory 612 via a bus 606. In certain aspects, the computer-readable medium/memory 612 is configured to store instructions that when executed by processor 604, cause the processor 604 to perform the operations illustrated in FIG. 3, or other operations for performing the various techniques discussed herein.

In certain aspects, the processing system 602 may further include a transmit component 614 for performing the operations illustrated in FIG. 3. Additionally, the processing system 602 may include a receive 616 for performing the operations illustrated in FIG. 3. Additionally, the processing system 602 may include a taking action component 618 for performing the operations illustrated in FIG. 3. Additionally, the processing system 602 may include a controlling component 620 for performing the operations illustrated in FIG. 3. The transmit component 614, receive component 616, taking action component 618, and controlling component 620 may be coupled to the processor 604 via bus 606. In certain aspects, the transmit component 614, receive component 616, taking action component 618, and controlling component 620 may be hardware circuits. In certain aspects, the transmit component 614, receive component 616, taking action component 618, and controlling component 620 may be software components that are executed and run on processor 604.

Figure 7:
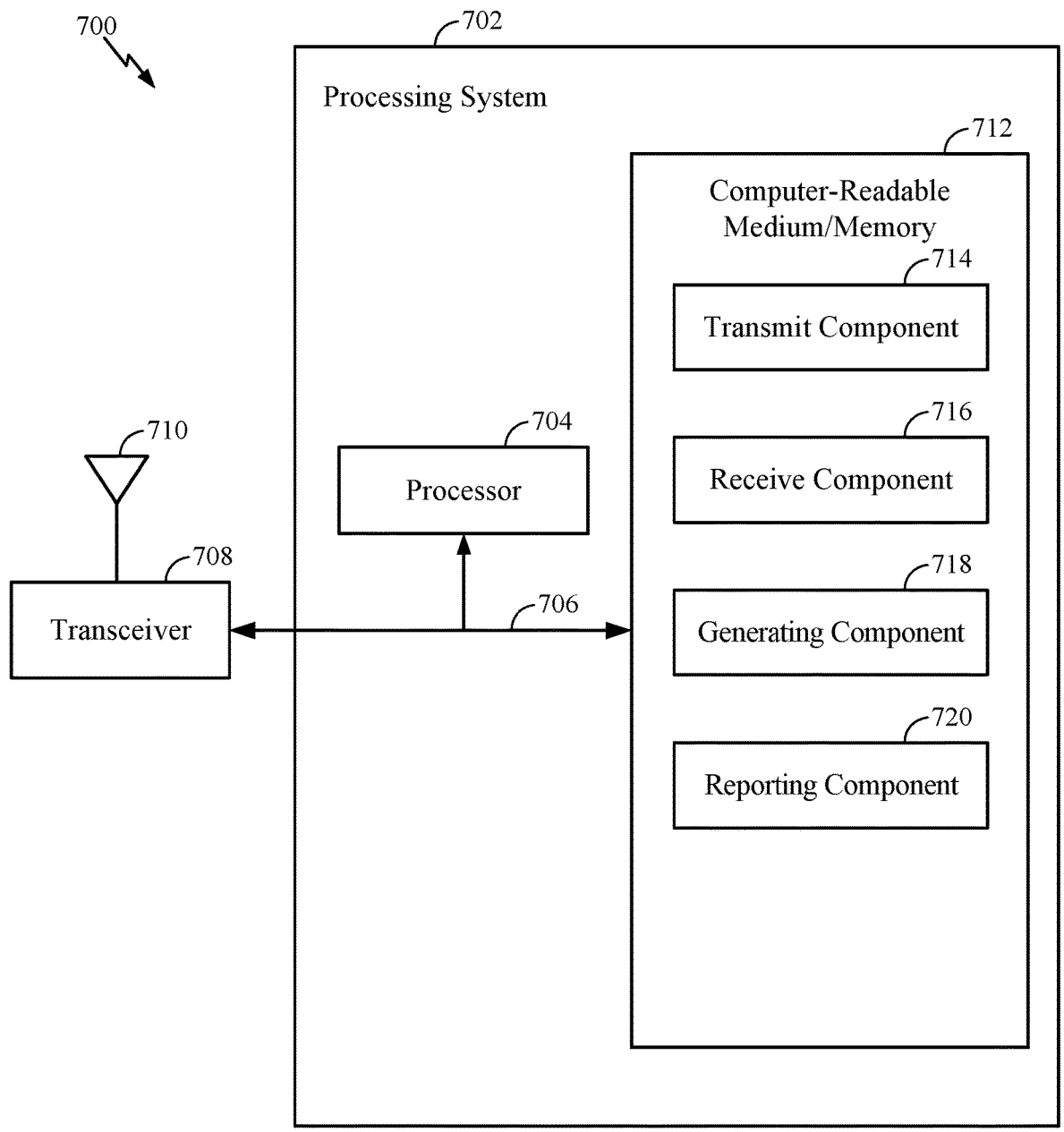
FIG. 7 illustrates a communications device that may include various components configured to perform operations for the techniques disclosed herein in accordance with aspects of the present disclosure.

FIG. 7 illustrates a communications device 700 (e.g., UE 120) that may include various components (e.g., corresponding to means-plus-function components) configured to perform operations for the techniques disclosed herein, such as the operations illustrated in FIG. 4. The communications device 700 includes a processing system 702 coupled to a transceiver 708. The transceiver 708 (e.g., a transmitter and/or receiver) is configured to transmit and/or receive signals for the communications device 700 via an antenna 710, such as the various signal described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions that when executed by processor 704, cause the processor 704 to perform the operations illustrated in FIG. 4, or other operations for performing the various techniques discussed herein.

In certain aspects, the processing system 702 may further include a transmit component 714 for performing the operations illustrated in FIG. 4. Additionally, the processing system 702 may include a receive component 716 for performing the operations illustrated in FIG. 4. Additionally, the processing system 702 may include a generating component 718 for performing the operations illustrated in FIG. 4. Additionally, the processing system 702 may include a reporting component 720 for performing the operations illustrated in FIG. 4. The transmit component 714, receive component 716, generating component 718, and reporting component 720 may be coupled to the processor 704 via bus 706. In certain aspects, the transmit component 714, receive component 716, generating component 718, and reporting component 720 may be hardware circuits. In certain aspects, the transmit component 714, receive component 716, generating component 718, and reporting component 720 may be software components that are executed and run on processor 704.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 3 and 4.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a base station (BS), comprising:
   transmitting, in a multi-user multiple-input and multiple-output (MU-MIMO) mode, a first one or more beamformed transmissions using a first beam to a first user equipment (UE) in a first sector and a second one or more beamformed transmissions using a second beam to a second UE in a second sector, wherein the BS is configured to control a plurality of sectors comprising the first sector and the second sector;
   receiving, from the first UE, a feedback report indicating inter-sector interference encountered by the first UE in the first sector due to the second one or more beamformed transmissions; and
   taking one or more actions based on the feedback report to reduce the inter-sector interference encountered by the first UE in the first sector, wherein the taking one or more actions comprises:
      selecting a third UE in the second sector;
      transmitting, in the MU-MIMO mode, the first one or more beamformed transmissions using the first beam to the first UE in the first sector and a third one or more beamformed transmissions using a third beam to the third UE in the second sector in a first time period; and
      transmitting, in the MU-MIMO mode, the second one or more beamformed transmissions using the second beam to the second UE in the second sector in a second time period that is different than the first time period.

2. The method of claim 1, wherein each of the first one or more beamformed transmissions indicates a first beam index associated with the first beam and a first sector index associated with the first sector, and wherein each of the second one or more beamformed transmissions indicates a second beam index associated with the second beam and a second sector index associated with the second sector.

3. The method of claim 1, wherein the first one or more beamformed transmissions comprises a scheduling control message that indicates a first beam index associated with the first beam, a first sector index associated with the first sector and the first beam, a second beam index associated with the second beam, and a second sector index associated with the second sector and the second beam.

4. The method of claim 1, wherein:
   each of the first one or more beamformed transmissions and the second one or more beamformed transmissions comprises at least one of: a beam training transmission, a beam management transmission, a data transmission, or a synchronization signal.

5. The method of claim 1, wherein the first one or more beamformed transmissions are transmitted via a first sector antenna that is arranged in a different azimuthal orientation than a second sector antenna used for transmitting the second one or more beamformed transmissions.

6. The method of claim 1, wherein the feedback report provides one or more received signal powers of the second one or more beamformed transmissions, a beam index associated with each of the one or more received signal powers, and a sector index associated with each of the one or more received signal powers.

7. The method of claim 1, wherein receiving the feedback report comprises receiving the feedback report via at least one of: an acknowledgment (ACK) message, a negative ACK (NACK) message, a channel state information (CSI) report, an interference measurement report, or a beam management report.

8. The method of claim 1, wherein the taking one or more actions further comprises at least one of:
   adjusting a transmit power for the second beamformed transmissions transmitted on the second beam based on the second sector being identified in the feedback report;
   transmitting to the second UE using a different beam than the second beam for the second beamformed transmissions; or
   transmitting to the first UE in single-user MIMO mode.

9. A method of wireless communication by a user equipment (UE), comprising:
   receiving, in a first sector, a first one or more beamformed transmissions transmitted via a first beam from a base station (BS);
   receiving, in the first sector, one or more interfering beamformed transmissions transmitted via a second beam from the BS, the one or more interfering beamformed transmissions being associated with the second beam and with a second sector, wherein the BS is configured to control a plurality of sectors comprising the first sector and the second sector, and wherein the first one or more beamformed transmissions comprises a scheduling control message that indicates a first beam index associated with the first beam, a first sector index associated with the first sector and the first beam, a second beam index associated with the second beam, and a second sector index associated with the second sector and the second beam;
generating a feedback report indicating inter-sector interference encountered by the UE in the first sector due to the one or more interfering beamformed transmissions; and
reporting the feedback report to the BS.

10. The method of claim 9, wherein the one or more interfering beamformed transmissions comprises an indication of a beam index associated with the second beam and a sector index associated with the second sector.

11. The method of claim 9, wherein:
the one or more interfering beamformed transmissions comprises at least one of: a beam training transmission, a beam management transmission, a data transmission, or a synchronization signal.

12. The method of claim 9, wherein the first one or more beamformed transmissions are transmitted via a first sector antenna that is arranged in a different azimuthal orientation than a second sector antenna used for transmitting the one or more interfering beamformed transmissions.

13. The method of claim 9, wherein the feedback report provides one or more received signal powers of the one or more interfering beamformed transmissions, a beam index associated with each of the one or more received signal powers, and a sector index associated with each of the one or more received signal powers.

14. The method of claim 13, wherein the one or more received signal powers are measures of signal power of the one or more interfering beamformed transmissions received by the UE.

15. The method of claim 9, wherein reporting the feedback report comprises reporting the feedback report via at least one of: an acknowledgment (ACK) message, a negative ACK (NACK) message, a channel state information (CSI) report, an interference measurement report, or a beam management report.

16. An apparatus for wireless communication, comprising:
a transmitter configured to transmit, in a multi-user multiple-input and multiple-output (MU-MIMO) mode, a first one or more beamformed transmissions using a first beam to a first user equipment (UE) in a first sector and a second one or more beamformed transmissions using a second beam to a second UE in a second sector, wherein the apparatus is configured to control a plurality of sectors comprising the first sector and the second sector;
a receiver configured to receive, from the first UE, a feedback report indicating inter-sector interference encountered by the first UE in the first sector due to the second one or more beamformed transmissions; and
a processing system configured to take one or more actions based on the feedback report to reduce the inter-sector interference encountered by the first UE in the first sector, wherein the processing system being configured to take the one or more actions comprises the processing system being configured to:
select a third UE in the second sector;
cause the transmitter to transmit, in the MU-MIMO mode, the first one or more beamformed transmissions using the first beam to the first UE in the first sector and a third one or more beamformed transmissions using a third beam to the third UE in the second sector in a first time period; and
cause the transmitter to transmit, in the MU-MIMO mode, the second one or more beamformed transmissions using the second beam to the second UE in the second sector in a second time period that is different than the first time period.

17. The apparatus of claim 16, wherein each of the first one or more beamformed transmissions indicates a first beam index associated with the first beam and a first sector index associated with the first sector, and wherein each of the one or more second beamformed transmissions indicates a second beam index associated with the second beam and a second sector index associated with the second sector.

18. The apparatus of claim 16, wherein the first one or more beamformed transmissions comprises a scheduling control message the indicates a first beam index associated with the first beam, a first sector index associated with the first sector and the first beam, a second beam index associated with the second beam, and a second sector index associated with the second sector and the second beam.

19. The apparatus of claim 16, wherein:
each of the first one or more beamformed transmissions and the second one or more beamformed transmissions comprises at least one of: a beam training transmission, a beam management transmission, a data transmission, or a synchronization signal.

20. The apparatus of claim 16, where in the transmitter is configured to transmit the first one or more beamformed transmissions via a first sector antenna that is arranged in a different azimuthal orientation than a second sector antenna used for transmitting the second one or more beamformed transmissions.

21. The apparatus of claim 16, wherein the feedback report provides one or more received signal powers of the second one or more beamformed transmissions, a beam index associated with each of the one or more received signal powers, and a sector index associated with each of the one or more received signal powers.

22. An apparatus for wireless communication, comprising:
a receiver configured to:
receive, in a first sector, a first one or more beamformed transmissions transmitted via a first beam from a base station (BS), and
receive, in the first sector, one or more interfering beamformed transmissions transmitted via a second beam from the BS, the one or more interfering beamformed transmissions being associated with the second beam and with a second sector, wherein the BS is configured to control a plurality of sectors comprising the first sector and the second sector, wherein the first one or more beamformed transmissions comprises a scheduling control message that indicates a first beam index associated with the first beam, a first sector index associated with the first sector and the first beam, a second beam index associated with the second beam, and a second sector index associated with the second sector and the second beam;
a processing system configured to generate a feedback report indicating inter-sector interference encountered by the apparatus in the first sector due to the one or more interfering beamformed transmissions; and
a transmitter configured to transmit the feedback report to the BS.

23. The apparatus of claim 22, wherein the one or more interfering beamformed transmissions comprises an indication of a beam index associated with the second beam and a sector index associated with the second sector.

24. The apparatus of claim 22, wherein:
the one or more interfering beamformed transmissions comprises at least one of: a beam training transmission, a beam management transmission, a data transmission, or a synchronization signal.

25. The apparatus of claim 22, wherein the feedback report provides one or more received signal powers of the one or more interfering beamformed transmissions, a beam index associated with each of the one or more received signal powers, and a sector index associated with each of the one or more received signal powers.

26. The apparatus of claim 25, wherein the one or more received signal powers are measures of signal power of the one or more interfering beamformed transmissions received by the UE.

27. The apparatus of claim 22, wherein the transmitter is configured to transmit the feedback report via at least one of: an acknowledgment (ACK) message, a negative ACK (NACK) message, a channel state information (CSI) report, an interference measurement report, or a beam management report.

* * * * *